(12) United States Patent
McKee et al.

(10) Patent No.: US 9,969,505 B2
(45) Date of Patent: May 15, 2018

(54) UAV LAUNCH AND RECOVERY

(71) Applicant: Lockheed Martin Corporation, Bethesda, MD (US)

(72) Inventors: Thomas Sandlin McKee, Madison, AL (US); Steve Conrad Roden, Huntsville, AL (US)

(73) Assignee: Lockheed Martin Corporation, Bethesda, MD (US)

( * ) Notice: Subject to any disclaimer, the term of this patent is extended or adjusted under 35 U.S.C. 154(b) by 404 days.

(21) Appl. No.: 14/963,965

(22) Filed: Dec. 9, 2015

(65) Prior Publication Data
US 2016/0167805 A1    Jun. 16, 2016

Related U.S. Application Data

(60) Provisional application No. 62/089,562, filed on Dec. 9, 2014.

(51) Int. Cl.
*B64F 1/10* (2006.01)
*B64C 39/02* (2006.01)
*B60P 3/11* (2006.01)
*G05D 1/02* (2006.01)

(52) U.S. Cl.
CPC .... *B64F 1/10* (2013.01); *B60P 3/11* (2013.01); *B64C 39/024* (2013.01); *G05D 1/021* (2013.01); *B64C 2201/08* (2013.01); *B64C 2201/14* (2013.01); *B64C 2201/182* (2013.01)

(58) Field of Classification Search
CPC .......... B64F 1/10; B60P 3/11; B64C 2201/08; B64C 2201/182; B64G 1/1078
See application file for complete search history.

(56) References Cited

U.S. PATENT DOCUMENTS

| 2,774,557 | A | * | 12/1956 | Jakimiuk | ................ B64F 1/10 244/103 R |
| 5,109,788 | A | | 5/1992 | Heinzmann | |
| 5,150,860 | A | * | 9/1992 | Young | ..................... B64F 1/10 244/50 |
| 8,172,177 | B2 | | 5/2012 | Lovell et al. | |

(Continued)

FOREIGN PATENT DOCUMENTS

| WO | 2010117762 A2 | 10/2010 |
| WO | 2015195175 | 12/2015 |

OTHER PUBLICATIONS

Northrup Gumman MQ-8 Fire Scout. Retrieved from http://en.wikipedia.org/wiki/MQ-8_Fire_Scout. 7 pages. Retrieved on Mar. 9, 2016.

(Continued)

*Primary Examiner* — Brian M O'Hara
(74) *Attorney, Agent, or Firm* — Reising Ethington P.C.

(57) ABSTRACT

A UAV support vehicle carries a UAV support apparatus for launching and/or recovering a UAV while the UAV support vehicle is moving. The UAV support apparatus releases the UAV during launch and receives the UAV during recovery. An active suspension may be connected between the UAV support vehicle and at least a portion of the UAV support apparatus and reduce motion imparted to that portion of the UAV support apparatus. During UAV recovery, data from a synchronization link between the UAV and the UAV support vehicle may be used to maneuver the UAV and/or the UAV support vehicle.

17 Claims, 7 Drawing Sheets

(56) References Cited

U.S. PATENT DOCUMENTS

| | | |
|---|---|---|
| 8,453,967 B2 | 6/2013 | Miller et al. |
| 8,464,981 B2 | 6/2013 | Goldie et al. |
| 8,567,718 B1 | 10/2013 | McDonnell |
| 2007/0158498 A1 | 7/2007 | Snediker |
| 2009/0294584 A1 | 12/2009 | Lovell et al. |
| 2013/0325222 A1 | 12/2013 | Roh |
| 2014/0252162 A1 | 9/2014 | Teller |
| 2017/0137150 A1* | 5/2017 | Conyers .................. B64F 1/007 |
| 2017/0197725 A1* | 7/2017 | Foo ....................... B64C 39/024 |

OTHER PUBLICATIONS

SMSS. Retrieved from http://www.lockheedmartin.com/us/products/smss.html. 2 pages. Retrieved Mar. 9, 2016.

International Search Report and Written Opinion of the International Searching Authority dated Jun. 7, 2016 for International Application No. PCT/US2015/064771 filed on Dec. 9, 2015.

\* cited by examiner

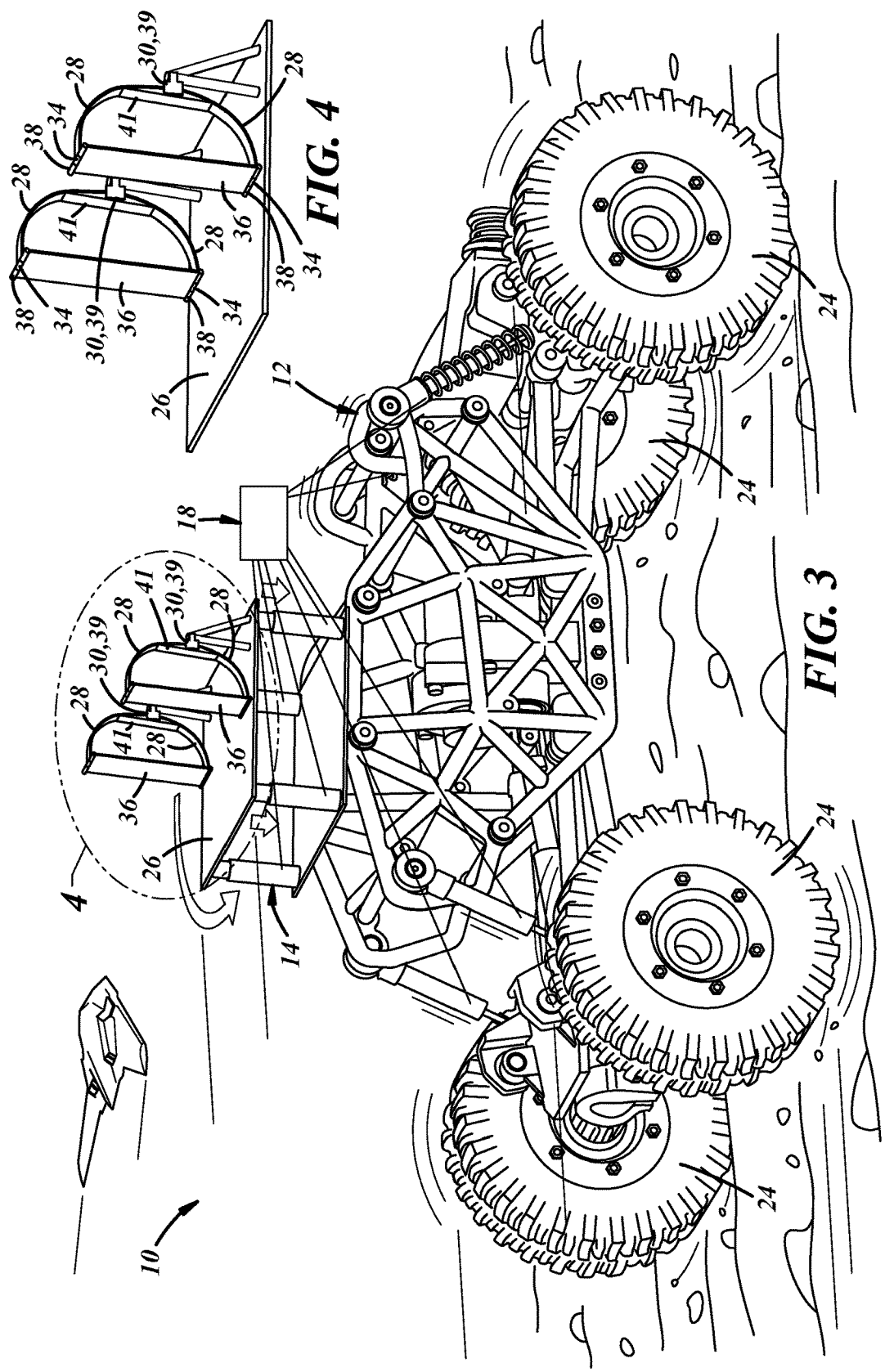

9,969,505 B2

UAV LAUNCH AND RECOVERY

CROSS-REFERENCE TO RELATED APPLICATIONS

This application is a Non-Provisional Patent Application that claims the benefit of the Dec. 9, 2014 filing date of U.S. Provisional Patent Application Ser. No. 62/089,562, which is hereby incorporated by reference in its entirety.

STATEMENT REGARDING FEDERALLY SPONSORED RESEARCH OR DEVELOPMENT

Not Applicable

BACKGROUND

Field

This application relates generally to launching and recovering unmanned air vehicles.

Description of Related Art Including Information Disclosed Under 37 CFR 1.97 and 1.98

Launch and recovery of un-manned aerial vehicles (UAVs) often involves special equipment because UAVs are sometimes required to operate from areas where the terrain is too rough to serve as a runway, and, to save weight, many UAVs are built without landing gear. To deal with these factors, catapult systems may be used to launch UAVs and nets may be used to recover them. UAV launch and recovery using catapults and nets can damage or accelerate wear to a UAV due to abrupt accelerations experienced by UAVs during catapult launches and abrupt decelerations experienced during net recoveries.

Launch and recovery of UAVs from moving naval vessels generally results in lesser impacts being imparted to UAVs during launch and recovery when UAVs are launched and recovered upwind from moving vessels. However, rolling and pitching of a naval vessel can make it difficult to fly UAVs into recovery apparatus accurately and can complicate UAV launches as well. This is especially true when recovering UAVs on a smaller vessel and/or in heavy seas.

SUMMARY

A system for supporting UAV operations comprises a UAV support vehicle capable of moving through an air mass at a speed suitable for recovering a UAV, a UAV support apparatus carried by the UAV support vehicle, and an active suspension connected between at least a portion of the UAV support vehicle and at least a portion of the UAV support apparatus. The active suspension is programmed to reduce motion imparted to at least that portion of the UAV support apparatus.

A method of deploying a UAV comprises the steps of providing a UAV on a UAV support apparatus carried by a UAV support vehicle, moving the support vehicle through an air mass at a speed suitable for launching the UAV in self-powered flight through the air mass, reducing motion imparted to the UAV support apparatus by actuating an active suspension connected between at least a portion of the UAV support apparatus and at least a portion of the UAV support vehicle, and releasing the UAV from the UAV support apparatus.

A method of capturing an airborne UAV during a UAV recovery operation comprises the steps of moving a UAV support vehicle through an air mass at a speed suitable for capturing an airborne UAV, establishing a synchronization link between the UAV and the UAV support vehicle, referencing data from the synchronization link to maneuver at least one of the UAV or the UAV support vehicle into respective positions allowing the UAV support vehicle to capture the airborne UAV, and causing the UAV support vehicle to capture the UAV.

DRAWING DESCRIPTIONS

FIG. 3 is a perspective view of the system of FIGS. 1 and 2, with the UAV shown approaching the UAV support vehicle from behind as the UAV support vehicle is moving;

FIG. 4 is a magnified view of a portion of the UAV support apparatus enclosed by circle 4 in FIG. 3;

DETAILED DESCRIPTION

Figures 5, 6:
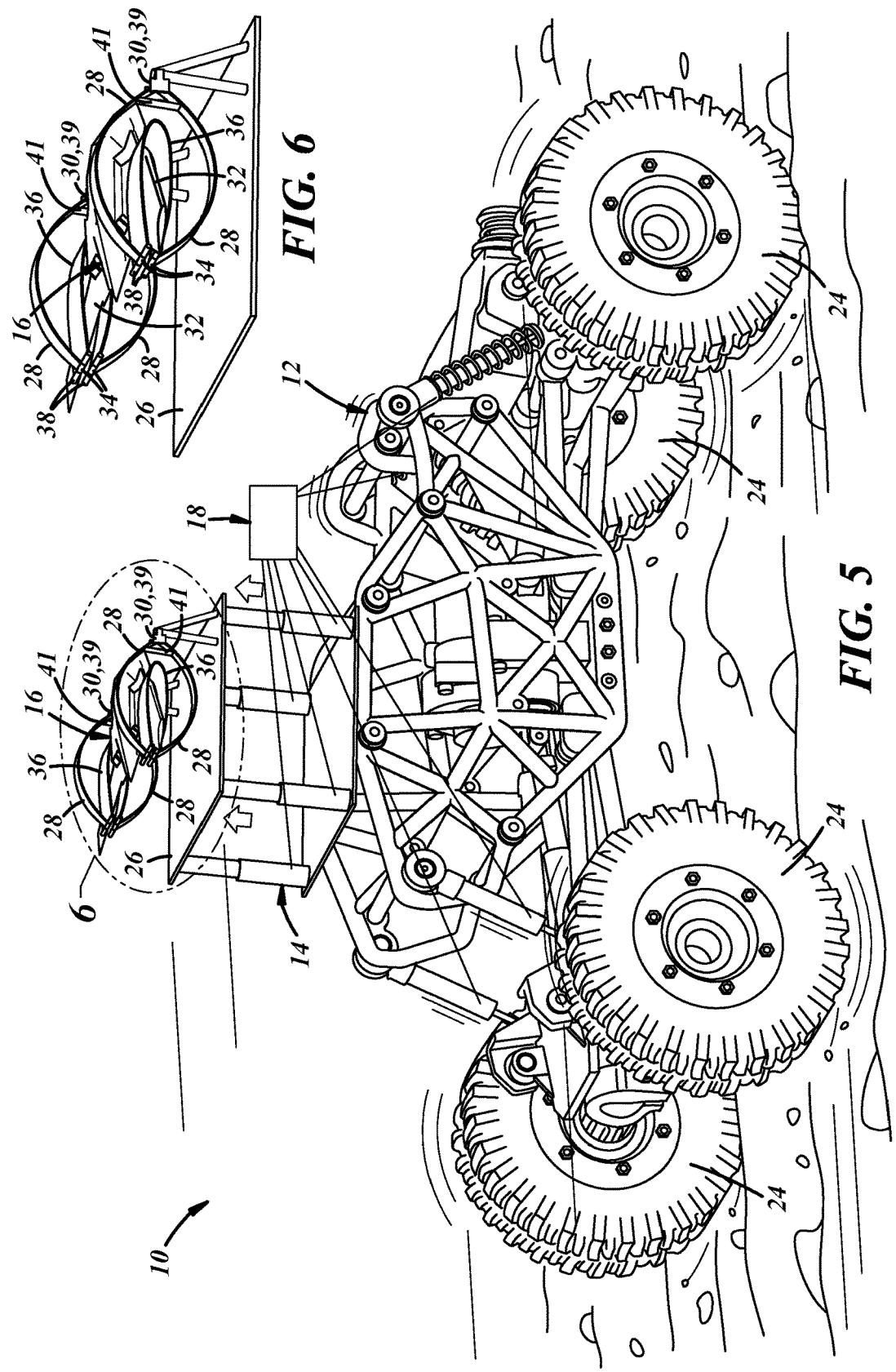
FIG. 5 is a perspective view of the system of FIGS. 1-3, with the UAV shown captured by closure of the tongs following a pop-up maneuver of the UAV support apparatus.
FIG. 6 is a magnified view of a portion of the UAV support apparatus enclosed by circle 6 in FIG. 5.

A system for supporting UAV operations is generally shown at 10 in the drawings. The system 10 comprises a UAV support vehicle 12; which may be any vehicle, such as a land, water, or air vehicle; that is capable of moving through an air mass at a speed suitable for launching and/or recovering a UAV. The system 10 also comprises a UAV support apparatus 14 that is carried by the UAV support vehicle 12 and is configured to carry a UAV 16 as shown in FIGS. 1, 5, and 6; is actuable to release a UAV 16 during UAV launch operations as shown in FIGS. 1 and 2; and is configured to receive a UAV 16 during UAV recovery operations as shown in FIGS. 3-6.

Figure 1:
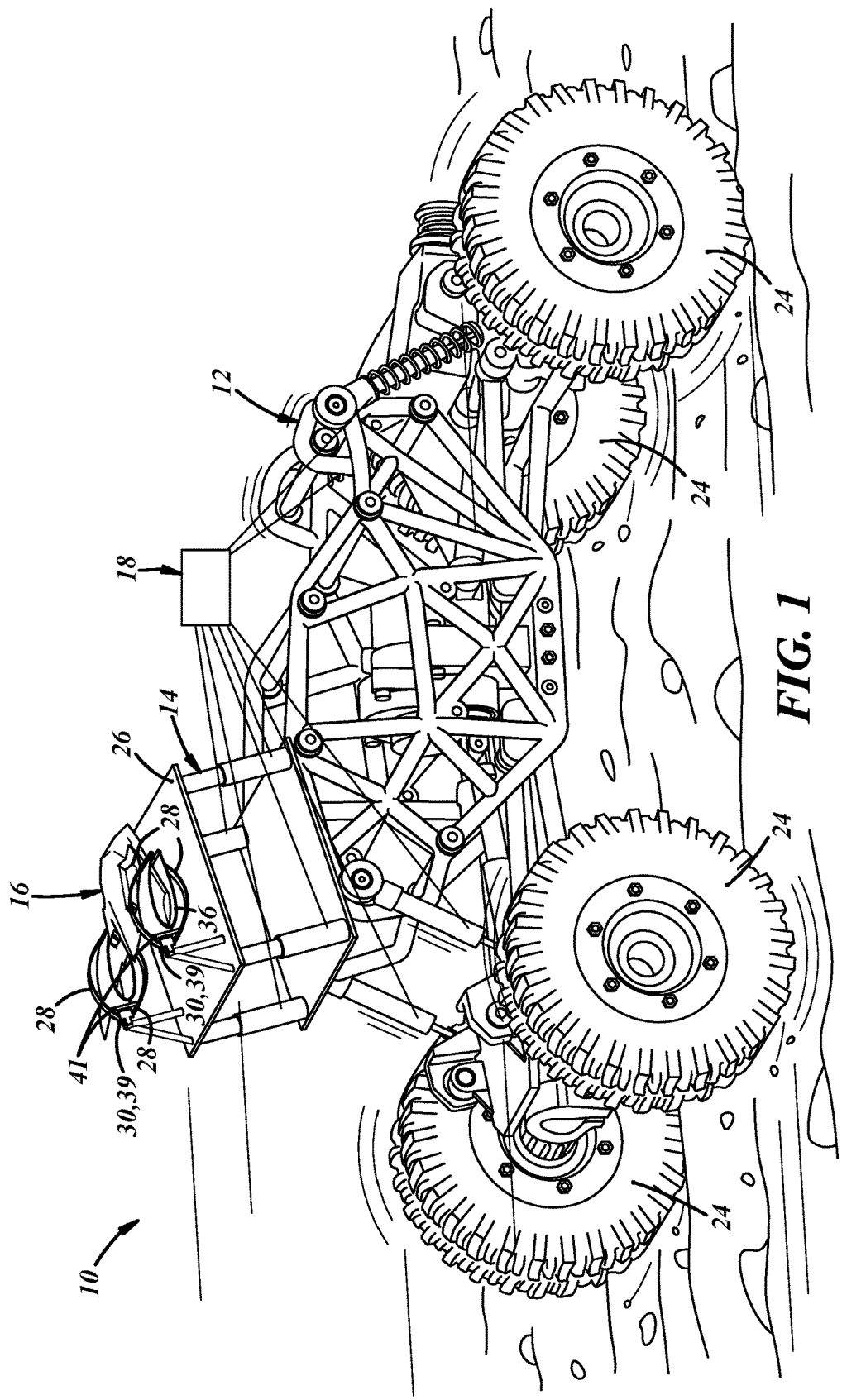
FIG. 1 is a perspective view of a system for supporting UAV operations, with a UAV support vehicle of the system carrying a UAV in a UAV support apparatus of the system and shown accelerating to a UAV launch velocity.
Figure 2:
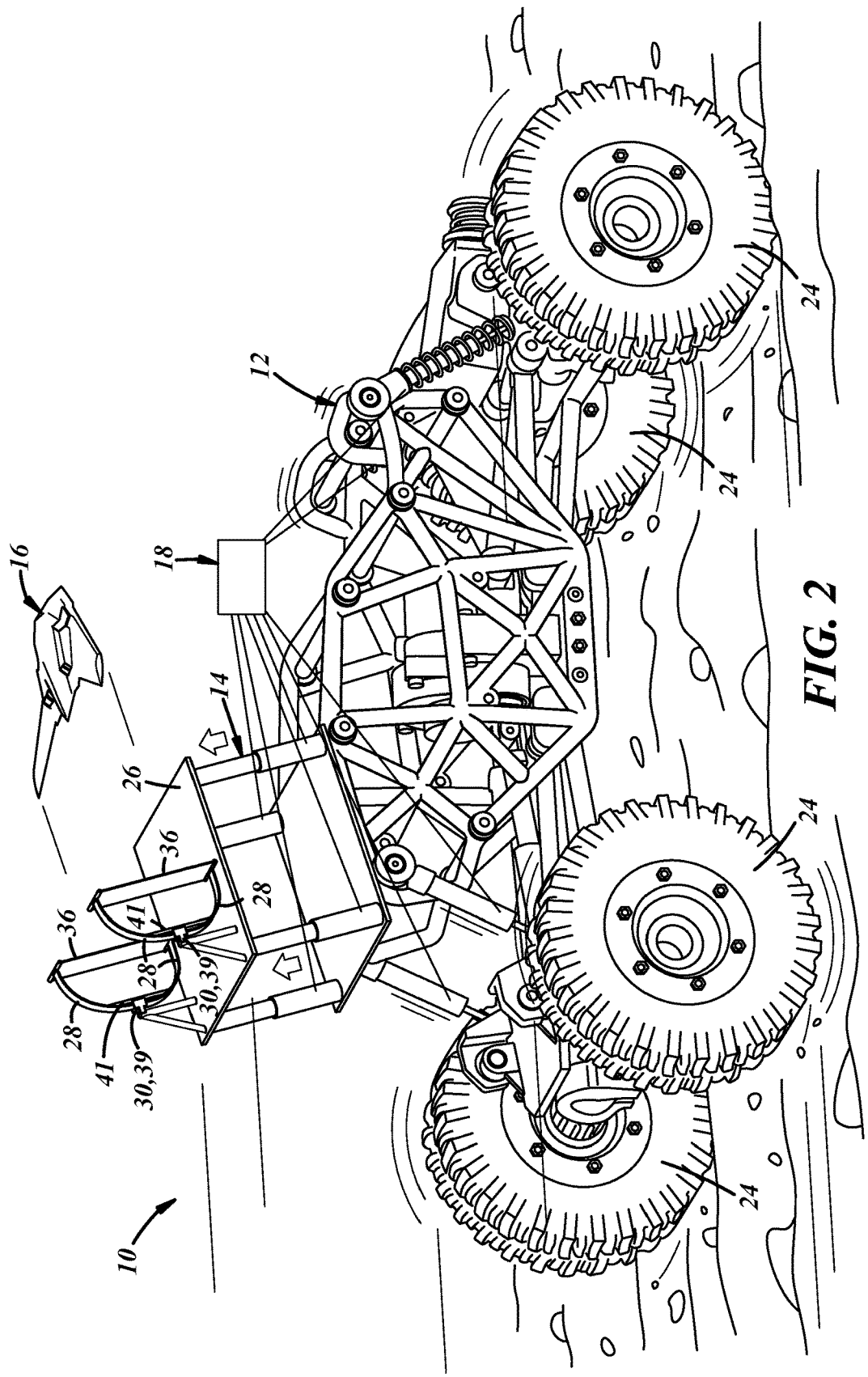
FIG. 2 is a perspective view of the system of FIG. 1, with the UAV shown airborne immediately after having been launched from the UAV support apparatus following a "pop-up" maneuver and opening of tongs of the UAV support apparatus to release the UAV.

The UAV support vehicle 12 and UAV support apparatus 14 may be configured to launch a UAV 16 by accelerating or decelerating the UAV support vehicle 12 to a speed suitable for launching the UAV 16 as shown in FIG. 1, then actuating the UAV support apparatus 14 to release the UAV 16 as shown in FIG. 2. As shown in FIGS. 3-6, the vehicle 12 may also be configured to accelerate or decelerate to a speed suitable for recovering or retrieving the UAV 16 such that the UAV 16 may land on or otherwise be received by the UAV support apparatus 14 with minimal relative motion or speed differential between the UAV 16 and the UAV support vehicle 12. With little or no speed differential, the chance that the UAV 16 might incur damage during the landing or retrieval process is reduced.

As shown in FIGS. 1-3, 5, and 8; a ride leveler or active suspension 18 may be connected between the UAV support vehicle 12 and at least a portion of the UAV support apparatus 14. The active suspension 18 is operable to reduce motion imparted to at least a portion of the UAV support apparatus 14. Where, as shown in the drawings, the UAV support vehicle 12 is a land vehicle, the active suspension 18 may alternatively or additionally be connected between a chassis of the UAV support vehicle 12 and wheels 24 or tracks of the UAV support vehicle 12 as shown in FIGS. 1-3 and 5.

The active suspension 18 may be configured to stabilize the UAV support apparatus 14 or components of the UAV support apparatus 14 during launch or retrieval of a UAV 16. The active suspension 18 may, for example, absorb motion imparted to a UAV support land vehicle by rough ground, to a UAV support water vehicle by waves, and/or to a UAV support air vehicle by air turbulence or inter-related aerodynamic forces generated between the UAV support air vehicle and a UAV 16. The active suspension 18 may comprise any suitable ride leveling active suspension system, such as a Bose® Active Suspension System.

As shown in FIGS. 1-6, the UAV support apparatus 14 may include a platform 26, and two pairs of tongs 28 carried by the platform 26 and actuable to release a UAV in a UAV launch operation and to receive and capture a UAV in a UAV recovery operation. In a preferred embodiment, each pair of tongs 28 may comprise spring steel leaves, but any suitably strong and/or flexible material may be used in other embodiments. Each pair of tongs 28 may be attached to the platform 26 via one or more hinges 30, so that the two pairs of tongs 28 can receive and close on respective wings 32 of a UAV 16 prior to launch and during recovery as shown in FIGS. 1, 5, and 6; and so that the two pairs of tongs 28 can open when releasing the UAV 16 during launch as shown in FIG. 2. Although, in a preferred embodiment, two pairs of tongs 28 are carried by the platform 26, other embodiments may carry different quantities and arrangements of tongs 28 to accommodate different shapes and sizes of UAVs.

As best shown in FIGS. 4 and 6, outer ends 34 of each pair of tongs 28 may be bridged by a strap 36 secured at each of two strap ends 38 to the respective outer ends. This allows the impact of UAV wings 32 on the respective straps 36 to cause the straps 36 to pull the outer ends 34 of each pair of tongs 28 toward each other, moving the pairs of tongs 28 toward their respective closed positions around the UAV wings 32. A landing UAV 16, by flying its wings 32 into the straps 36, will thus cause the two pairs of tongs 28 to move toward their respective closed positions around the wings 32 where the UAV 16 is secured to the support apparatus 14 as shown in FIGS. 5 and 6. This capture operation transfers any remaining kinetic energy of the UAV 16 (relative to the support vehicle 12) to the two pairs of tongs 28, which decelerates the UAV 16 more gradually while capturing and securing the UAV 16 to the support apparatus 14, thus reducing the risk of damage to the UAV 16 during a recovery operation.

In a preferred embodiment, the straps 36 may comprise a tough thermoplastic material such as Dyneema, but in other embodiments, the straps 36 may comprise any suitably strong and/or flexible material. To assist in securing the UAV 16, the two pairs of tongs 28 may be restricted from reopening via a ratchet mechanism 39, or other suitable mechanism that permits the two pairs of tongs 28 to move only in a closing direction toward respective closed positions, and resists motion of the two pairs of tongs 28 toward respective open positions unless the ratchet mechanism 39 is released by a controller or operator.

As best shown in FIGS. 4 and 6, each pair of tongs 28 may include a linear actuator 41 connected between its leaves and configured to drive the leaves apart when commanded to do so during UAV launch operations by a controller such as a UAV support vehicle controller 44. Accordingly, the support vehicle controller 44 may be coupled with the linear actuators 41 and programmed to command the linear actuators 41 to open the tongs 28 during UAV launch operations when the UAV 16 to be launched is traveling at an airspeed that will support UAV flight. The controller 44 may also be programmed to command the linear actuators 41 to drive open the tongs 28 with sufficient force to cause the straps 36 to impart a forward vector to the UAV 16 as they snap taught.

The UAV support vehicle controller 44 may be carried by the UAV support vehicle 12 or may be located remote from the UAV support vehicle 12. In either case, the UAV support vehicle controller 44 is coupled with the UAV support vehicle 16, i.e., with various UAV support vehicle systems such as steering actuators, guidance systems, and sensors; such that information can be passed between the UAV support vehicle controller and one or more of the UAV support vehicle systems, and such that commands can be passed from the UAV support vehicle controller 44 to one or more of the UAV support vehicle systems.

The linear actuators 41 may be configured to drive the leaves closed when commanded to do so by a controller, such as the UAV support vehicle controller 44, during UAV recovery operations. Accordingly, the UAV support vehicle controller 44 may be programmed to command the linear actuators 41 to close the pairs of tongs 28 during UAV recovery operations when a UAV 16 enters the tongs 28, e.g., when the controller 44 receives inputs from the linear actuators 41 indicating that the actuators 41 have sensed a UAV 16 impacting the straps 36 and thus applying compressive force on the linear actuators 41. The UAV support vehicle controller 44 may further be programmed to schedule the closing of the pairs of tongs 28 to dampen the impact of the drone on the straps 36 and to control UAV deceleration.

The UAV support apparatus 14 may be movable and/or reconfigurable to move the two pairs of tongs 28 between a launch position, as shown in FIGS. 1 and 2, and a recovery position, as shown in FIGS. 3-6. In the launch position the two pairs of tongs 28 may be facing or positioned to open toward a direction of travel of the UAV support vehicle 12. With the UAV support apparatus 14 in its launch position, the two pairs of tongs 28 are configured to receive and carry the UAV 16 and to position the UAV 16 in an attitude suitable for takeoff once a minimum flying speed of the UAV 16 has been attained.

The UAV support apparatus 14 may be configured to sense the amount of lift being generated by the UAV 16, and to release the UAV 16 once the UAV support apparatus 14 senses that the UAV 16 is generating at least enough lift to support level flight. UAV lift sensing may be provided by any one of a number of known sensor systems capable of sensing and measuring the amount of force applied to a structure.

As shown in FIG. 2, the UAV support apparatus 14 may be configured to assist UAV 16 launch by "popping up" as it releases the UAV 16, i.e., by moving the UAV 16 in a generally upward direction with and/or relative to the UAV support vehicle 12, imparting an initial upward vector to assist in immediately moving the UAV 16 a safe distance away from the UAV support apparatus 14 following release.

As shown in FIG. 5, the UAV support vehicle 12 and/or apparatus 14 may also be configured to "pop up" during a recovery operation to assist in retrieving a UAV 16 from flight. In each case, this "pop up" maneuver may preferably comprise a motion of at least a portion of the support apparatus 14 upward relative to the UAV support vehicle 12, but in other embodiments the "pop up" maneuver may instead, or in addition, include a motion of the entire UAV support vehicle 12, or at least a "sprung" portion of the UAV support vehicle 12.

In a UAV recovery operation, and as shown in FIG. 5, the "pop up" maneuver may be used to temporarily or momentarily move the support apparatus 14, or at least a portion of the support apparatus 14, to a desired position relative to the UAV 16 to aid in recovery. In a ground vehicle embodiment, the vehicle may also or alternatively actuate its active suspension system 18 to cause a sprung portion of the UAV support vehicle 12 to move upward relative to an un-sprung portion of the vehicle 12, or even to cause the entire vehicle 12 to leap off the ground to help close the distance with the landing UAV 16 and may, in so doing, avoid one or more obstacles in its path, and the shocks that those obstacles would impart.

As shown in FIGS. 1-6, the UAV support apparatus 14 may be configured to catch the UAV 16 during a UAV recovery operation by allowing for rotation of the UAV support apparatus 14, or a portion of the UAV support apparatus 14, to the recovery position, i.e., to a position approximately 180 degrees from the launch position of the UAV support apparatus 14. In other words, to allow the UAV support system 10 to be used both in launching and recovering a UAV 16, the UAV support apparatus 14 may be configured to allow for rotation of the support apparatus 14 or at least a portion of the support apparatus 14 relative to the UAV support vehicle 12 to alternately face the front and rear of the UAV support vehicle 12, i.e., toward and away from a support vehicle direction of travel in respective launch and recovery positions such that the tongs 28 are positioned to face or open toward UAV support vehicle direction of travel for UAV launch and are positioned to face or open away from UAV support vehicle direction of travel during recovery.

Figure 8:
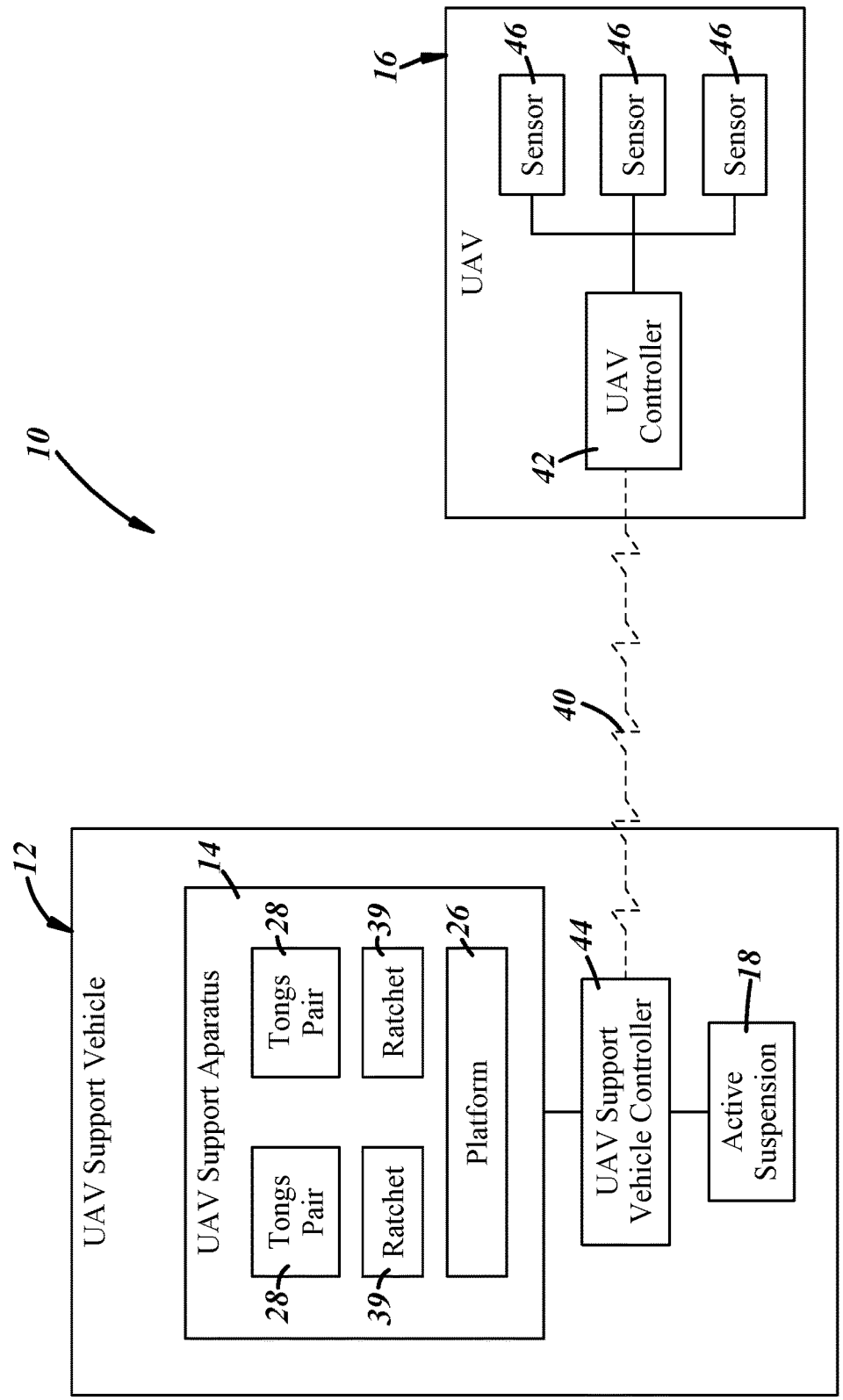
FIG. 8 is a schematic block diagram showing a system for supporting UAV flight operations.

As shown in FIG. 8, the UAV support system 10 may comprise a synchronization link 40 coupling a UAV controller 42 with the support vehicle controller 44 to provide communication between the controllers 42, 44. The UAV controller 42 may be mounted on the UAV 16 or may be located remote from the UAV 16. In either case, the UAV controller 42 is coupled with the UAV 16 and various UAV systems such as flight control actuators, guidance systems, and sensors 46; such that information can be passed between the UAV controller 42 and one or more of the UAV systems, and such that commands can be passed from the UAV controller 42 to one or more of the UAV 16 systems. The UAV controller may be a Lockheed Martin Imperium™ Expeditionary Ground Control System (XGCS), but in other embodiments any suitable UAV ground control system may be used.

The synchronization link 40 may be configured to share data between the UAV support vehicle 12 and the UAV systems. For example, the support vehicle controller 44 may be programmed to use data gathered from the synchronization link 40 to detect the relative location of the UAV 16 and to maneuver to intercept and capture the UAV 16 during a recovery operation.

The UAV controller 42 may additionally or instead be programmed to use data gathered from the synchronization link 40 to detect the relative location of the support vehicle 12 and to maneuver the UAV 16 to intercept and be captured by the support vehicle 12. The UAV support vehicle 12 may additionally or instead be configured to use data gathered from the synchronization link 40 to more accurately perform the "pop up" maneuver to move the support apparatus 14 to a position facilitating capture and retrieval of the UAV 16 from the air. The synchronization link 40 may be established via any suitable means to include optical and/or radio communication between the UAV 16 and the support vehicle 12.

Figure 7A:
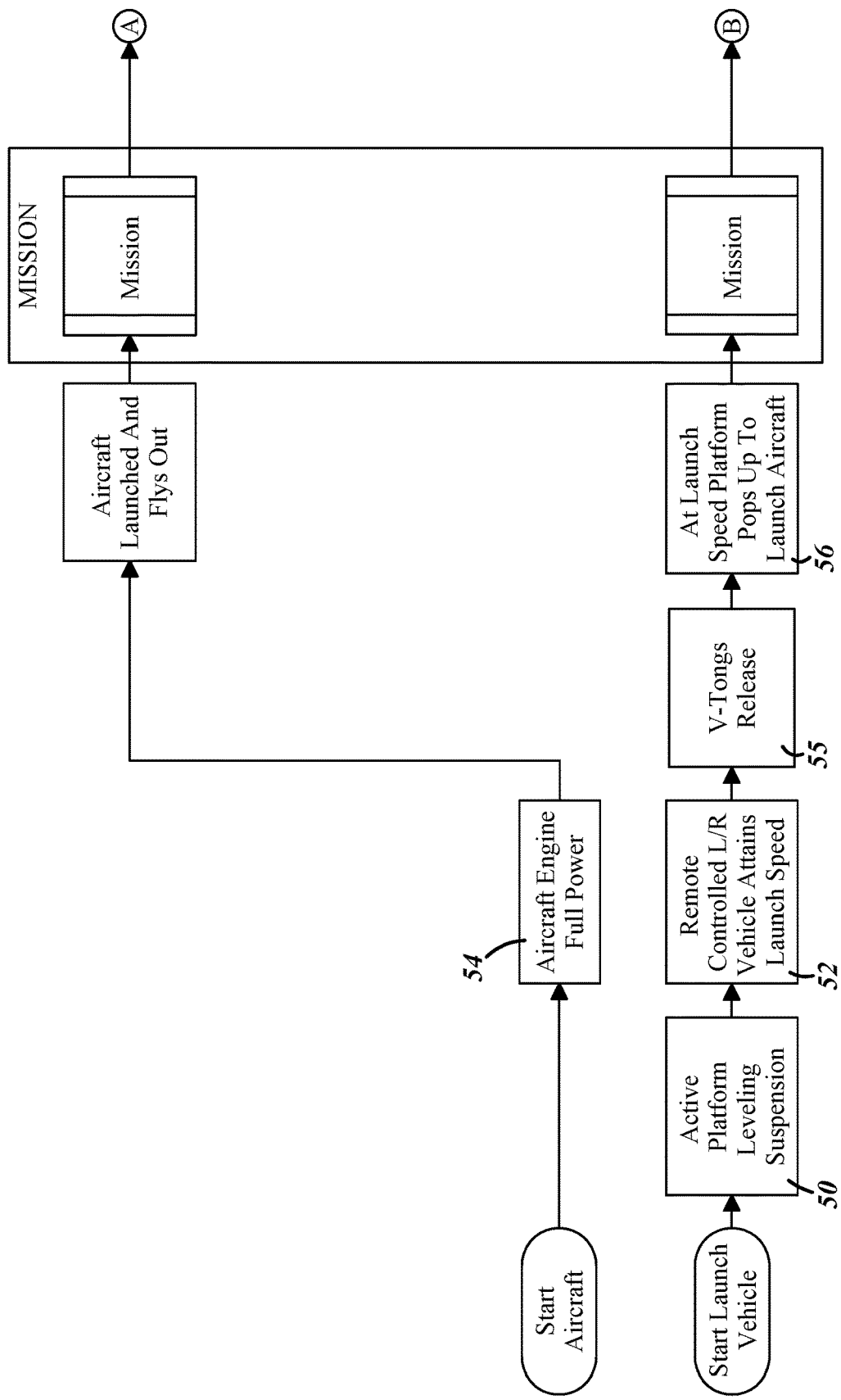
FIG. 7A is a flow chart showing a method of launching a UAV and a method of recovering an airborne UAV.

In practice, a UAV 16 may be deployed using the UAV support system 10 by rotating the UAV support apparatus 14 to its launch position, mounting the UAV 16 on the UAV support apparatus 14, activating the UAV support vehicle's active suspension 18 to provide stability during launch, as shown in action step 50 of FIG. 7A, and accelerating the support vehicle 12 to a speed suitable for launching the UAV 16 as shown in action step 52. An engine of the UAV 16 may also be started at an appropriate time before, during, or after support vehicle acceleration, as shown in action step 54, to provide sufficient thrust to maintain powered flight following separation from the UAV support apparatus 14. Upon sensing that the UAV 16 has sufficient lift to sustain flight, the UAV support vehicle 12 and/or apparatus 14 may release the UAV 16 according to action step 55, and pop up to provide a separation vector as shown in action step 56.

Figure 7B:
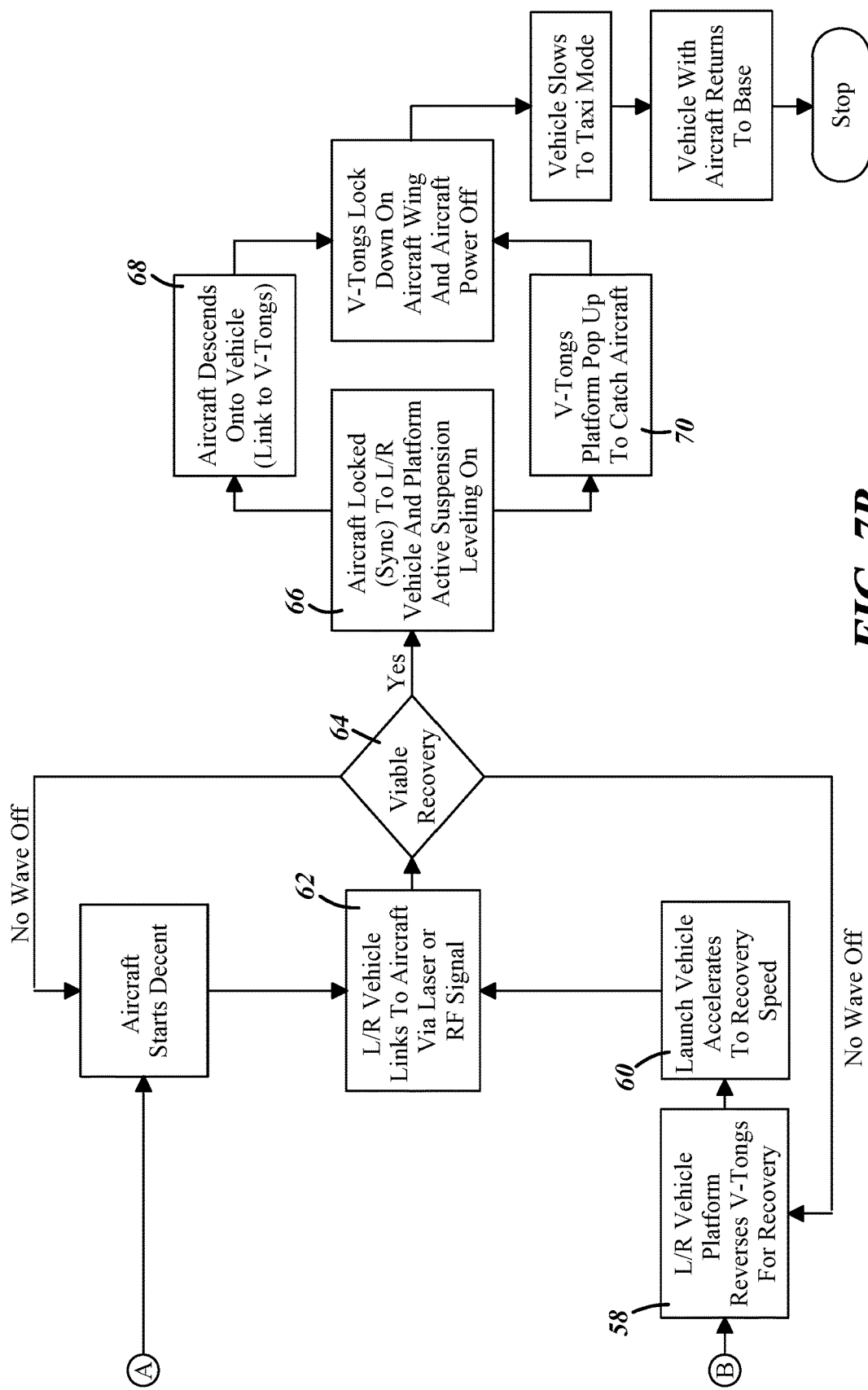
FIG. 7B is a continuation of FIG. 7A.

A UAV 16 may be recovered using the UAV support system 10 via the following steps shown in FIG. 7B. The UAV support apparatus 14 may be rotated to its recovery position as shown in action step 58. The UAV support vehicle 12 may accelerate to a speed suitable for recovering the UAV 16 as shown in action step 60. As shown in action step 62, a synchronization link may be established between the UAV 16 and the UAV support vehicle 12, allowing the UAV 16 and the UAV support vehicle 12 to locate and maneuver relative to one another to position the UAV 16 for capture by the UAV support apparatus 14. Data from the synchronization link 40 may be used to determine whether the UAV 16 and the support vehicle 12 are in relative positions suitable to perform a viable recovery operation as shown in action step 64. If the recovery operation is viable, the UAV controller 42 may be synchronized to the support vehicle controller 44, and the support vehicle's active suspension 18 may be activated to provide stability during landing as shown in action step 66. Data from the synchronization link 40 may be used to command the UAV to descend toward the support vehicle's support apparatus 14 as shown in action step 68. According to action step 70, data from the synchronization link 40 may also be used to determine and control when and how the UAV support vehicle 12 and/or apparatus 14 pops up to capture the UAV 16 once the UAV 16 is close enough to the UAV support vehicle 12 to accomplish this operation.

A system for supporting UAV operations constructed as disclosed above, and a method for supporting UAV operations executed as disclosed above, allow a UAV to deploy from and/or recover to a moving support vehicle with minimal risk of damage from impacts that might otherwise be caused between the UAV and the support vehicle due to motion of the support vehicle due to rough terrain, or from impact due to a difference in relative velocity between the UAV and the support vehicle.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

The invention claimed is:

1. A system for supporting UAV operations, the system comprising:
    a UAV support vehicle capable of moving through an air mass at a speed suitable for launching a UAV into the air mass;
    a UAV support apparatus that is carried by the UAV support vehicle, and is configured to carry the UAV at an attitude for UAV launch and is actuable to release the UAV into self-powered flight; and
    an active suspension that is connected between the UAV support vehicle and at least a portion of the UAV support apparatus for carrying the UAV and that is programmed to automatically reduce motion imparted to at least that portion of the UAV support apparatus during carriage and launch of the UAV.

2. The system of claim 1 in which:
    the UAV support vehicle is capable of moving through an air mass at a speed suitable for recovering a UAV from the air mass; and
    the UAV support apparatus is actuable to capture the UAV in a UAV recovery operation.

3. The system of claim 1 in which the UAV support apparatus is configured to detect lift generated by the UAV and to release the UAV when the UAV is generating sufficient lift to support flight.

4. The system of claim 2 in which the UAV support apparatus comprises tongs actuable to capture a UAV in a UAV recovery operation.

5. The system of claim 4 in which the tongs comprise at least one pair of tongs hinged in opposition to allow alternate relative motion toward and away from a closed position.

6. The system of claim 5 in which the support apparatus comprises at least one strap secured at each of two strap ends to respective outer ends of the at least one pair of tongs.

7. The system of claim 6 in which each pair of tongs includes a linear actuator coupled with a controller programmed to command the linear actuator to alternately open and close the pairs of tongs.

8. The system of claim 7 in which the controller is programmed to control UAV deceleration by scheduling the closing of the pairs of tongs.

9. The system of claim 6 in which the support apparatus includes a ratchet mechanism that permits relative motion of the at least one pair of tongs toward the closed position and resists motion of the at least one pair of tongs away from the closed position.

10. The system of claim 2 in which the UAV support apparatus:
    comprises tongs actuable to receive, carry, and release the UAV; and
    is reconfigurable to move the tongs between:
        a launch position facing a UAV support vehicle direction of travel for carrying and releasing a UAV in a UAV launch operation, and
        a recovery position facing opposite the UAV support vehicle direction of travel for capturing a UAV in a UAV recovery operation.

11. The system of claim 2, the system further comprising:
    a UAV controller coupled with the UAV;
    a support vehicle controller coupled with the UAV support vehicle; and
    a synchronization link coupling the UAV controller and the UAV support vehicle controller and configured to share data relating to the UAV and the UAV support vehicle.

12. The system of claim 11 in which the UAV controller is programmed to command the UAV to intercept a UAV support vehicle in response to data received from the synchronization link.

13. The system of claim 11 in which the support vehicle controller is programmed to command the support vehicle to intercept the UAV in response to data received from the synchronization link.

14. The system of claim 13 in which the active suspension is programmed to reduce motion imparted to at least a portion of the UAV support apparatus, and to execute commands from the support vehicle controller in response to data received from the synchronization link.

15. The system of claim 12 in which the UAV support vehicle controller is programmed to use data from the synchronization link to command the support vehicle to command the active suspension to move at least a portion of the support apparatus to a position facilitating capture of an airborne UAV during a UAV recovery operation.

16. A method of deploying a UAV, the method comprising:
    providing a UAV on a UAV support apparatus carried by a UAV support vehicle;
    moving the support vehicle through an air mass at a speed suitable for launching the UAV in self-powered flight through the air mass;
    actuating an active suspension connected between at least a portion of the UAV support apparatus and at least a portion of the UAV support vehicle, to automatically reduce motion imparted to at least a portion of the UAV support apparatus; and
    releasing the UAV from the UAV support apparatus.

17. The method of claim 16 in which the step of releasing the UAV includes detecting lift generated by the UAV and releasing the UAV when the UAV is generating sufficient lift to support flight.

* * * * *